United States Patent
Zhang et al.

(10) Patent No.: US 8,331,267 B2
(45) Date of Patent: Dec. 11, 2012

(54) SYSTEM AND METHOD FOR DETERMINING AN OPTIMAL BACKBONE FOR ROBOTIC RELAY NETWORKS

(75) Inventors: Ying Zhang, Cupertino, CA (US); Gabriel Hoffmann, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 307 days.

(21) Appl. No.: 12/771,283

(22) Filed: Apr. 30, 2010

(65) Prior Publication Data

US 2011/0267982 A1    Nov. 3, 2011

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)

(52) U.S. Cl. ........ 370/256; 370/241; 370/248; 370/249; 370/250; 370/251; 370/252; 370/254; 370/255; 370/406

(58) Field of Classification Search .................. None
See application file for complete search history.

(56) References Cited

U.S. PATENT DOCUMENTS

2006/0280131 A1* 12/2006 Rahman et al. ............... 370/256
2009/0285124 A1* 11/2009 Aguirre et al. ................ 370/255

\* cited by examiner

*Primary Examiner* — Hassan Phillips
*Assistant Examiner* — Lonnie Sweet
(74) *Attorney, Agent, or Firm* — Patrick J. S. Inouye; Krista A. Wittman

(57) ABSTRACT

A system and method for determining an optimal backbone for a robotic relay network are provided. A robotic relay network comprising a plurality of nodes including a base station node, one or more mobile relay nodes, and one or more user nodes is provided. A signal strength value for each pairwise communication link between each of the nodes is identified. A weight function is applied to each communication link value to determine a communication link weight. An optimal backbone tree is determined from the communication link weights.

15 Claims, 3 Drawing Sheets

SYSTEM AND METHOD FOR DETERMINING AN OPTIMAL BACKBONE FOR ROBOTIC RELAY NETWORKS

The U.S. Government has a paid-up license in this invention and the right in limited circumstances to require the patent owner to license others on reasonable terms as provided by the terms of Contract No. HR0011-08-C-0032 awarded by DARPA.

FIELD

This application relates in general to communication relay network optimization and, in particular, to a system and method for determining an optimal backbone for robotic relay networks.

BACKGROUND

Wireless networks interconnect a centralized communication system including a base station and one or more user nodes. Additionally, relay nodes can be interspersed between the base station and user nodes to extend range and quality of the communications link between the base station and user nodes.

Optimization of the network is a common problem in conventional fixed-base and user-node-based ad hoc wireless networks. Spanning tree algorithms are used to construct network trees connecting the base station to the user nodes through the relay nodes based on set parameters. For example, the tree that connects the base station to the user nodes using the least amount of relay nodes, the relay nodes with the best signal strength, or other consideration is determined. In the Steiner tree algorithm, a well-known NP-complete problem, a weighted tree with minimal weight that includes all user nodes is determined. However, the Steiner tree allows additional internal nodes to reduce the weight of the tree.

Development of mobile relay networks enables mobile relay nodes to autonomously move about an area to search for unconnected user nodes. Unlike conventional fixed-base and user-node-based ad hoc networks, which require placement of additional relay nodes or base stations to connect unconnected user nodes, mobile relay nodes can move and seek out additional user nodes in the environment. However, after initial deployment, disconnection, or breaking, of the existing connections between user nodes and the base station needs to be avoided during reconfiguration of the mobile relay nodes. Given an existing network configuration, the decision of which mobile relay nodes should stay in position and which mobile relay nodes should move is a problem.

Therefore, there is a need for an approach to maintain connectivity among existing user nodes and base stations while identifying mobile relay nodes that can be released from the network to seek connections with unconnected user nodes.

SUMMARY

An embodiment provides a system and method for determining an optimal backbone for a robotic relay network. A robotic relay network with a plurality of nodes including a base station node, one or more mobile relay nodes, and one or more user nodes is provided. A signal strength value for each pair-wise communication link between each of the nodes is identified. A weight function is applied to each communication link value to determine a communication link weight. An optimal backbone tree is determined from the communication link weights.

A further embodiment provides a system and method for determining an optimal backbone for a robotic relay network with minimal internal nodes. A robotic relay network with a plurality of nodes including a base station node, one or more mobile relay nodes, and one or more user nodes is provided. A signal strength value for each pair-wise communication link between each of the nodes is identified. A weight function is applied to each communication link value to determine a communication link weight. An optimal backbone tree with a minimal number of nodes connecting the user nodes to the base station is determined from the communication link weights.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
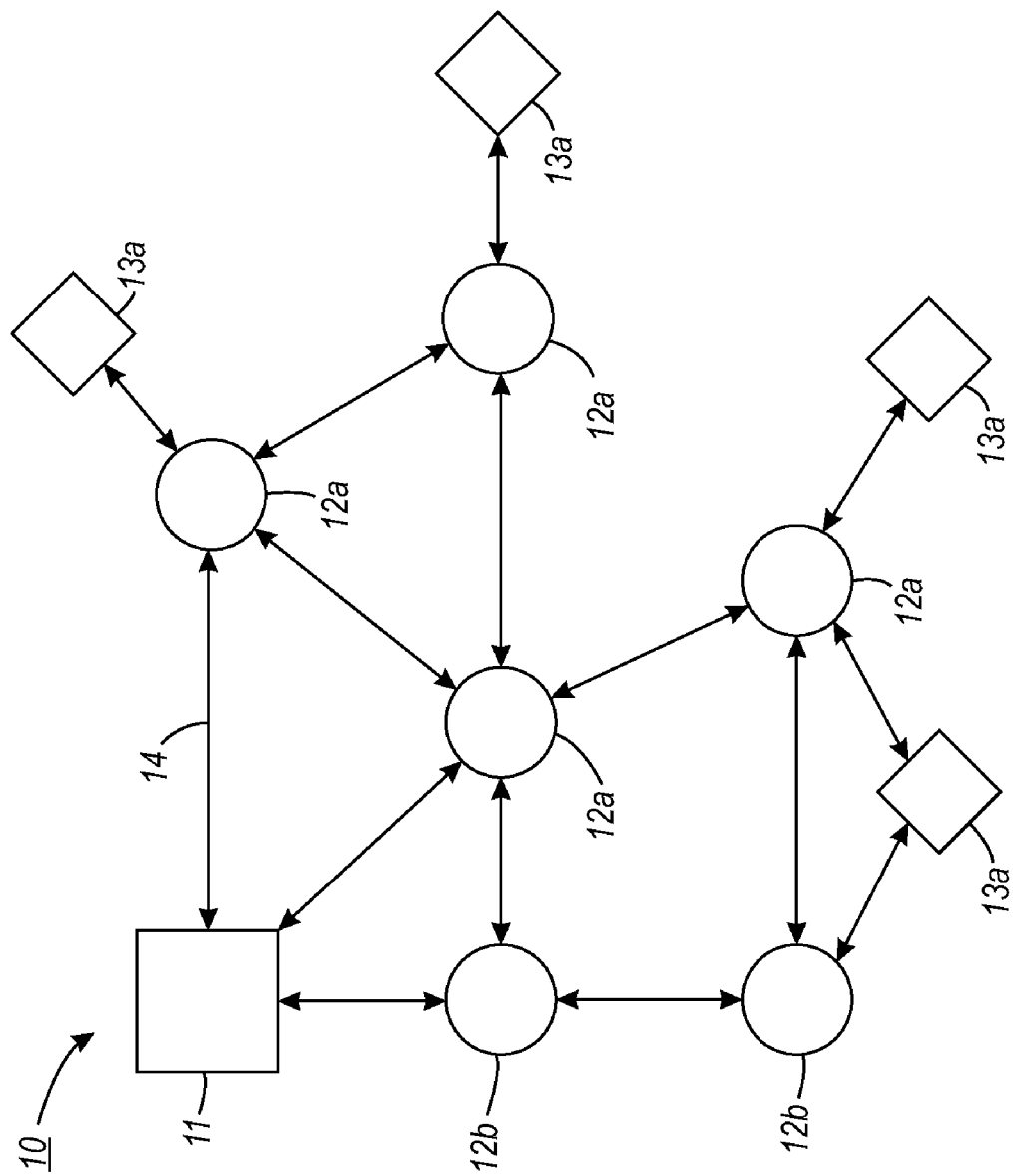
FIG. 1 is a block diagram showing, by way of example, a mobile relay network deployed in an environment.

An optimal backbone tree for a relay network is determined from the signal strength between nodes in the network. Redundant nodes not in the tree can move and locate previously unconnected nodes. FIG. 1 is a block diagram showing, by way of example, a mobile relay network 10 deployed in an environment. The mobile relay network 10 connects a base station 11 to one or more user nodes 13a. One or more mobile relay nodes 12a-b can be deployed to extend the range or quality of signal connection between the bases station 11 and user nodes 13a.

All user nodes 13a are connected, and send packets of data, to the same base station 10 through the mobile nodes 12a-b, known as a converge-cast pattern. The network topology is known and pair-wise connections are measured by received signal strength indication (RSSI) values. Other measurements, for example, delays and success/loss rates, either alone or in combination, are possible. As shown in FIG. 1, after initial deployment in an environment each user node 13a can be in pair-wise communication with one or more mobile relay nodes 12a-b within communication range and can connect to the base station 11 via the mobile relay nodes 12a-b through multiple possible paths 14. After an optimal backbone tree connecting the user nodes 13a to the base station 11 is identified, any mobile relay nodes 12a-b that are not part of the tree can search for unconnected user nodes in the environment without disrupting communication between the connected user nodes 13a and the base station 11, as further discussed below with reference to FIG. 2. Determining an optimal backbone tree can be used in applications such as robotic relay networks and robotic indoor navigation systems. The environment is a physical space, which can be logically defined as a two-dimensional planar space or three-dimensional surface space within which the mobile robot 12a-b moves and operates.

Generally, the mobile nodes 12a-b use self-contained on-board guidance systems, which can include environmental sensors to track relative movement, detect collisions, identify obstructions, or provide an awareness of the immediate surroundings. Sensor readings are used to plan the next movement or function to be performed. Movement can occur in a single direction or could be a sequence of individual movements, turns, and stationary positions.

In one embodiment, the mobile relay nodes 12a-b are implemented using mobile robots 12a-b. The mobile robot 12a-b, as well as the base station 11 and user nodes 13a, can include a power source and a communication interface to wirelessly interface to other robot nodes, base stations, and user nodes. A wide variety of wireless protocols and frequencies can be used. For example, Optimal Link State Routing over 802.11 radios at 5.8 GHz frequency can be used. However, the methods and systems disclosed herein are independent of which protocols or frequency are used. The mobile robot 12a-b can also include mobile power and a self-contained guidance system, for example, bumpers and proximity sensors, to move and guide the mobile robot about the environment, odometry to measure the distance traveled by, and position of, the mobile robot 12a-b within the environment, and a heading component to calculate the heading of the robot within the environment. In a further embodiment, the mobile robot 12a-b can include one or more short-range, such infrared or ultrasonic, or touch sensors for detection of an object. Other robot structures and components are possible.

The robot 12a-b can be operatively coupled or communicatively interfaced to a processor. The processor can either be separate from or integral to the mobile robot 12a-b. In one embodiment, the processor is a component separate from the mobile robot 12a-b and is interfaced to the base station 11 and can be implemented as an embedded micro-programmed system or as a general-purpose computer system, such as a personal desktop or notebook computer. The processor includes one or more modules for analyzing data gathered by the base station 11 and other nodes 12a-b, 13a about the mobile relay network 10 and to characterize the physical environment in which the mobile relay network 10 is deployed. The processor is a programmable computing device that executes software programs and includes, for example, a central processing unit, memory, network interfaced, persistent storage, and various components for interconnecting these components. The modules can be implemented as a computer program or procedure written as source code in a conventional programming language and is presented for execution by the central processing unit as object or byte code.

Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
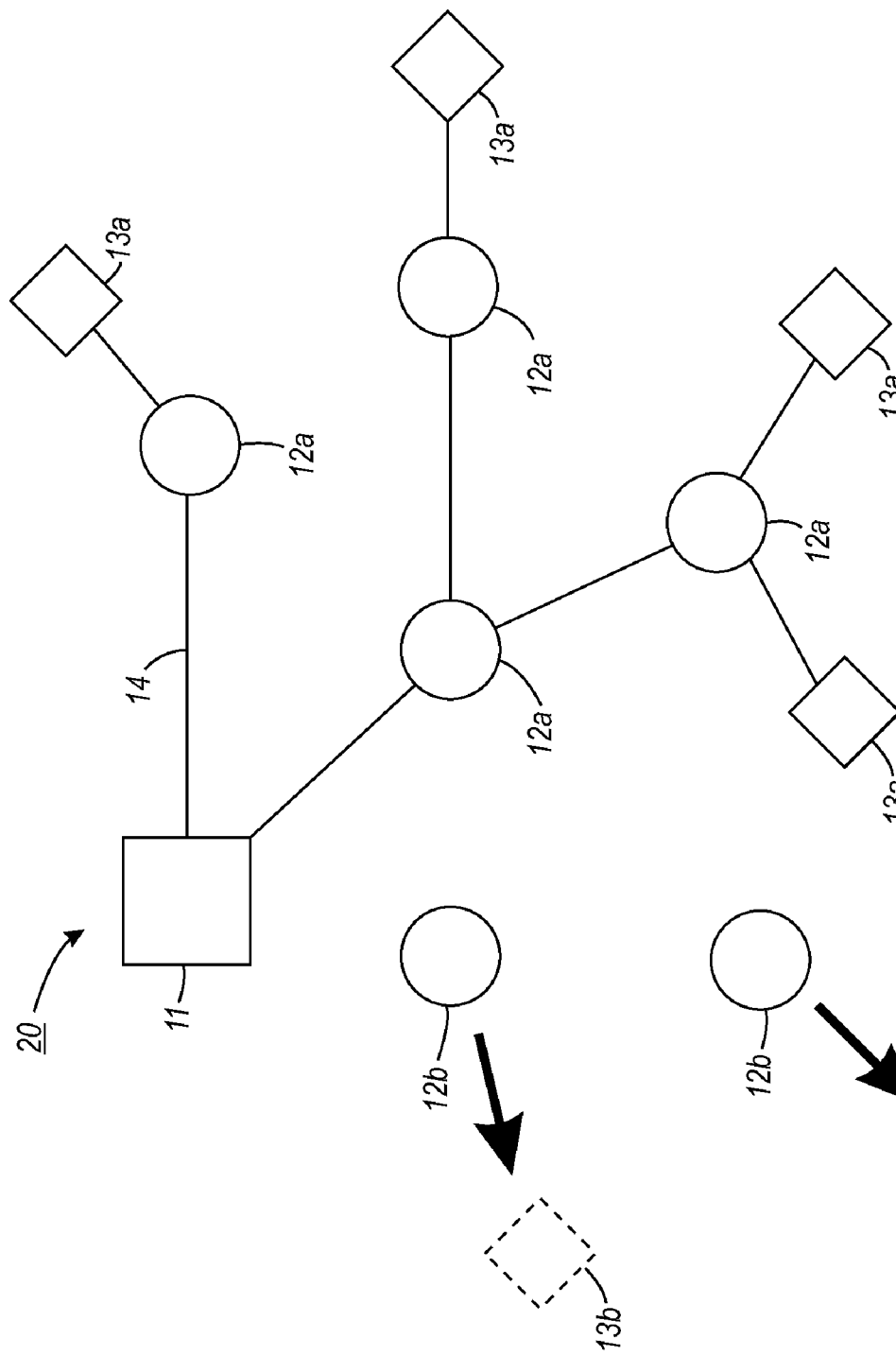
FIG. 2 is a block diagram showing, by way of example, an optimal backbone tree for the mobile relay network of FIG. 1.

A backbone tree is a tree that connects all user nodes within the network to the base station. An optimal backbone tree is a backbone tree that meets one or more optimization parameters. FIG. 2 is a block diagram showing, by way of example, an optimal backbone tree 20 for the mobile relay network 10 of FIG. 1. An optimal backbone tree 20 is identified from the possible trees of the mobile relay network 20. The user nodes 13a remain in uninterrupted connection with the base station 11 during determination and reconfiguration of the optimal backbone tree 20. The mobile nodes 12b, or redundant nodes, that are not part of the optimal backbone tree 20 are then directed to move and search for unconnected user nodes 13b or relay nodes 12c in the environment.

An optimal backbone for a mobile, or robotic, relay network can be generated in a number of ways depending on the criteria desired. Generally, communication signal strength throughout the nodes of the network is used to determine the optimal backbone. Since the network topology of the relay network 20 is known from neighbor node connections broadcasted over the network, the signal strength of each wireless connection between a user node 13a, mobile relay nodes 12 a-b, and base station 11 is identified. For example, received signal strength indication (RSSI) can be used. Other indicators, such as, delays or success/loss rates, or their combinations are possible.

After deployment, the communication signal strength in one direction between nodes may not be the same as in the opposite direction. Asymmetrical communication links can occur due to, for example, differently orientated signal antennae between two connected nodes, an intervening obstacle, or variations in height of the nodes in the environment. Asymmetric links are converted to symmetric links. In one embodiment, the total RSSI value in both directions is used to determine an average RSSI which is then used as the RSSI value of the communication link. In a further embodiment, the smaller of the pair-wise RSSI values is used as the RSSI value. Other ways of symetricizing the RSSI values are possible.

A weight function is then applied to each identified RSSI value, and an optimal network backbone is determined using the weighted RSSI values, as further discussed below, by way of example, with reference to FIGS. 3 and 4. Optionally, once the optimal backbone is determined, any remaining, or redundant, mobile nodes 12b are identified and can move to locate any previously unconnected user nodes 13b. The redundant mobile nodes 12b preferably maintains connection with the network during movement. Additionally, unconnected mobile nodes 12c can also be located. Once an unconnected node is discovered, the unconnected node 12c, 13b can be added to the network or the optimal backbone tree can be redetermined to include the previously unconnected node 12c, 13b.

Optimal backbone determination can be carried out in number of ways. In one embodiment, the optimization criteria minimizes the number of nodes that connect the user nodes to the base station, as further discussed below with reference to FIG. 3. In a further embodiment, the overall link quality is maximized in the optimal backbone tree 20, as further discussed below with reference to FIG. 4.

Figure 3:
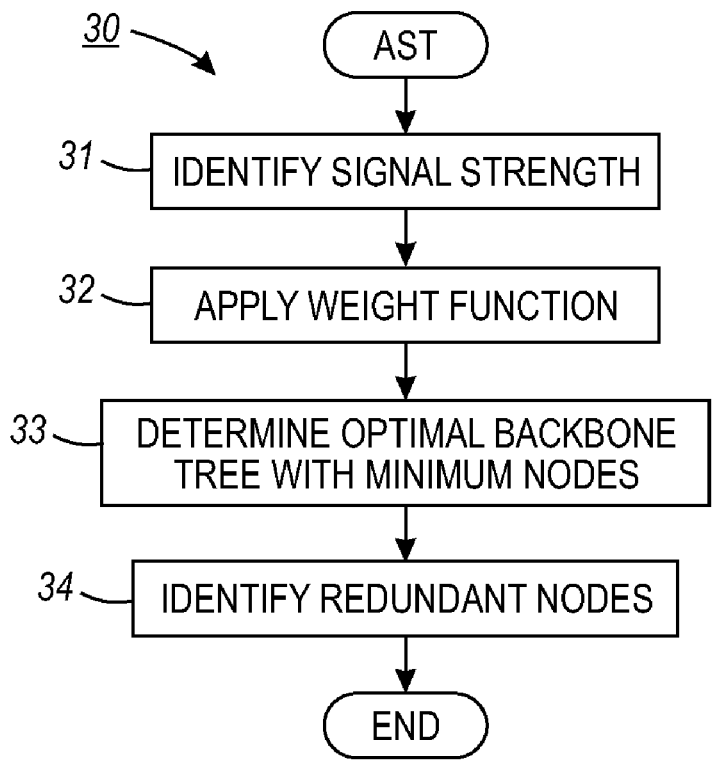
FIG. 3 is a flow diagram showing a method for generating an optimal backbone for a robotic relay network with minimal internal nodes, in accordance with one embodiment.
Figure 4:
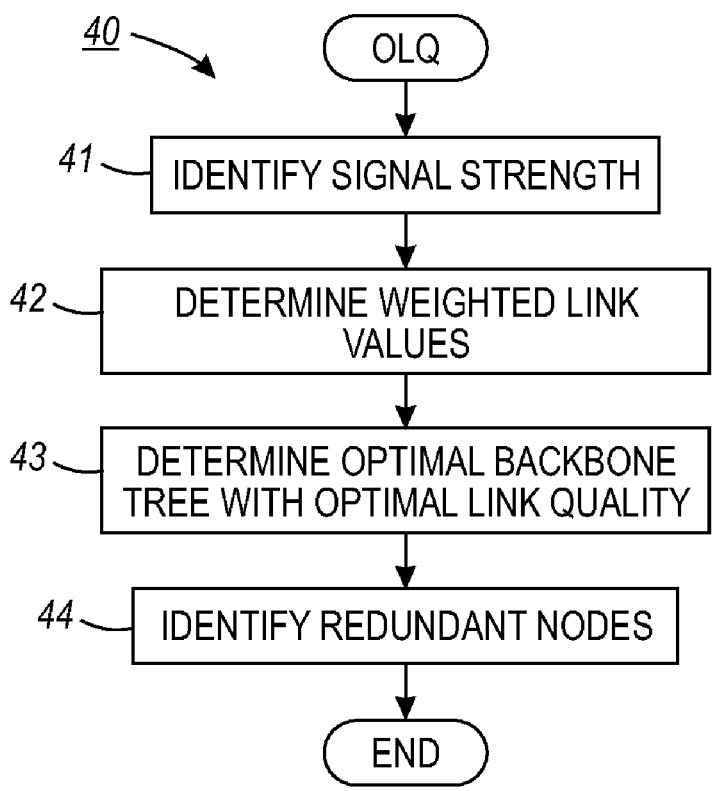
FIG. 4 is a flow diagram showing a method for generating an optimal backbone for a robotic relay network with optimal link quality, in accordance with one embodiment.

FIG. 3 is a flow diagram showing a method 30 for generating an optimal backbone for a robotic relay network with minimal internal nodes, in accordance with one embodiment. Unlike in a traditional Steiner Tree, where the weight of links connecting the base station to the user nodes is minimized even if other potential tree structures contain fewer nodes, optimization using Approximate Steiner Tree (AST) minimizes the number of nodes connecting a user node to the base station while maximizing the RSSI values of the tree. Given a graph G(V,E,w) and a subset of vertices S≦V, where V is the set of nodes including all user nodes and mobile nodes, E is the set of connections between two nodes, w is a function of RSSI, and S is the set of user nodes, the optimal backbone tree is found that minimizes the number of nodes while maximizing connection strength.

Initially, the signal strength between each connected pair of nodes is identified (block 31). The RSSI value range for a connected pair is set so that $w(v_{11})+w(v_{12})$ will always be greater than $w(v_{13})$ for any links 11, 12, and 13 when the weight function $w(v)=1/\sqrt{(v)}$ is applied (block 32), where v is the pair-wise RSSI value of the link. Setting such a range for RSSI minimizes the number of nodes in the tree. In one embodiment, the RSSI value range is between a minimum of 16 and maximum 64, so that w satisfies this requirement. Other value ranges are possible.

In another embodiment, a cut-off value for RSSI is used to increase the reliability of connections within the tree. The cut-off RSSI value can be a fixed value or a cut-off range. For example, the fixed cutoff RSSI value can be 20, which can be set higher than the minimum RSSI value. If RSSI is equal to or greater than 20, then the weight function $w(v)=1/\sqrt{(v)}$ is applied, otherwise $w(v)$ is set to infinity. Alternatively a constant value, c, can be added, such that $w(v)=c+1/\sqrt{(v)}$ when v is less than 20. For example, a constant such as n/4, where n is the number of nodes in the network can be used. In such a case, a link that has a RSSI value below 20 will not be chosen as part of the tree unless there are no other possible connections to use. Other fixed cutoff values are possible.

In a still further embodiment, a cut-off RSSI range is used. Initially, the minimum RSSI value required to have the tree connect to all users is determined, such as described further below with reference to FIG. 4. If v, the RSSI value, is in the range of 16 and 64, then the value of v is used as the cut-off value. For example, if v=19, then the RSSI range is set as (19, 64). When v is out of range, then the minimum, 16, or maximum, 64, RSSI value is used depending on which side of the minimum or maximum v falls on. Other cutoff ranges are possible.

Once the RSSI value of each pair-wise connection is determined and the weight functions is applied to each value, the pair-wise distance from each node to the base station is determined using a shortest path algorithm. The shorter path algorithm is used to calculate the shortest distance, or smallest sum of weights, between each user node and the base station. All nodes are ordered starting from the base station and user nodes, n1, n2, . . . nn.

After the shortest path algorithm is applied, the shorted distance from each node to the base station is known. Given a tree rooted at the base station, a node is labeled a parent node if the node is in the path from any other node to the base station, otherwise the node is labeled a leaf node. Given a distance, d(N, B), from a node, N, to the base station, B, then for any node N, a node Np is selected from all of N's neighbors to be a parent node if the value of the equation d(Np,B)+pt(Np) is the smallest value, where pt is a penalty value added to the distance based on whether the node Np has been previously selected as a parent node. For example, pt(Np)=0 if Np has been selected as a parent by another node, while pt(Np) is a number smaller than $1/\sqrt{(v)}$ for any v in the range so that the shortest path criteria is unaffected. In one embodiment, the pt(Np)=0.1 if the node has not been previously selected as a parent node, Np. Initially, all nodes are set as nonparent nodes. The penalty is applied to those connections that use a leaf node as an internal or parent node.

The combination of the penalty and shortest distance algorithm minimizes the number of links, or hops, from any node, including user nodes, to the base station. When multiple possible paths have the same number of hops, the path with the larger RSSI, and therefore lower w, measurement is chosen. For paths with the same path distance, determined from the total w of the path, nodes with multiple children are chosen to reduce the number of internal or parent nodes. Heuristically, parent nodes are reused if possible.

In some relay networks, routing of communication signals is predetermined or previously set. In such situations, the optimal backbone tree consists of the existing relay node configuration so that the configuration remains undisturbed to avoid temporal disconnection of the user nodes to the base station due to a change in configuration of the relay nodes. When determining the distance between a node, N, and the base station B along the shortest path, a penalty is added to non-relay nodes. For example, the penalty is added according to the equation:

$$d(N,B) \leftarrow \min(d(N,B), d(N,N')+d(N',B)+pt(N'))$$

where pt(N')=0 if N' is a relay node and pt(N') equals non-zero, for example 0.25, if N' is not a relay node.

An optimal backbone can be determined by maximizing the overall link quality of the backbone. FIG. 4 is a flow diagram showing a method 40 for generating an optimal backbone for a robotic relay network with optimal link quality (OLQ), in accordance with one embodiment. OLQ identifies and compares the worst quality link in all potential trees and the tree that has the best worst quality link is chosen. Quality of links is based on identified RSSI values (block 41). Given a graph G(V,E,w), where V is the set of nodes, E is the set of connections, and w is a weight on each connection, a tree that connects all V such that the maximum minimum weight for each RSSI value v on the links over the tree is determined.

The weight function is applied to the RSSI values (block 42) and is defined according to the equations:

$$w(v)=|v-vo| \text{ if } v>vc$$

and $$w(v)=M+vc-v \text{ if } v \leq vc$$

where vc is a cutoff threshold, vo is an optimal link value, vm is a maximum link value, and M=max(vo−vc, vm−vo). For example, the minimum or cutoff value and the maximum value for RSSI can be set as discussed above with reference to FIG. 3. Alternatively, the cutoff value can be set to an arbitrary value such as 20, as discussed above. Other weight functions are possible. If vo=vm, the strongest link available is chosen. If the minimum RSSI value of all the links in the tree is less than the cut-off value, for example, min(v)<vc, the network is unconnected.

Once the link weights are determined, the OLQ algorithm is applied to determine the optimal backbone (block 43). For each node N in the list of connected nodes, Nc, the link with the smallest w that connects to a node N' outside of Nc is found. N' is then added to Nc. The process is repeated until Nc includes all nodes in the graph. Initially, Nc includes only the base station.

As discussed above with reference to FIG. 3, when the current communication routing is preferred, a penalty can be added to non-relay nodes. When selecting next node N' to add to Nc, the smallest weighted value according to w(v)+pt(N') is selected, where pt(N')=0 for relay nodes and pt(N') equals max(w(v)) for non-relay nodes.

Once the optimal backbone tree is determined by either AST or OLQ, the nodes that are not identified as stable relays are identified as redundant relays and are then free to move about the environment to locate and connect to unconnected user nodes and mobile nodes.

While the invention has been particularly shown and described as referenced to the embodiments thereof, those skilled in the art will understand that the foregoing and other changes in form and detail may be made therein without departing from the spirit and scope of the invention.

What is claimed is:

1. A system for determining an optimal backbone for a robotic relay network, comprising:
    a robotic relay network comprising a plurality of nodes including a base station node, one or more mobile relay nodes, and one or more user nodes;
    a signal module to identify a signal strength value for each pair-wise communication link between each of the nodes;
    a weight module to apply a weight function to each communication link value to determine a communication link weight, wherein the weight function is applied according to one of the following equations:

$$w(v)=1/\sqrt{(v)}$$

where w is the communication link weight, and v is the signal strength value; or $$w(v)=|v-vo| \text{ if } v>vc \text{ and}$$

$$w(v)=M+vc-v \text{ if } v \leq vc$$

where w is the communication link weight, v is the signal strength value, vc is a cutoff signal strength value threshold, vo is an optimal signal strength value, vm is a maximum signal strength value, and M=max(vo−vc, vm−vo); and
    a backbone module to determine an optimal backbone tree from the communication link weights.

2. A system according to claim 1, further comprising:
    a node identification module to identify the mobile relay nodes in the optimal backbone tree as stable nodes and the remaining mobile relay nodes as redundant nodes.

3. A system according to claim 2, further comprising:
    a location module to locate nodes previously unconnected to the mobile relay network by the redundant nodes; and
    a connection module to connect the located nodes to the mobile relay network, wherein the backbone module is further configured to redetermine the optimal backbone tree to include the located nodes.

4. A system according to claim 1, further comprising:
    an optimization module to minimize the number of mobile relay nodes connecting the user nodes to the base station in the optimal backbone tree.

5. A system according to claim 1, further comprising:
    an optimization module to maximize optimal link quality of the optimal backbone tree.

6. A system according to claim 1, wherein the signal strength value for each pair-wise communication link is one of an average of the pair-wise communication link and the smaller of the pair-wise communication link.

7. A method for determining an optimal backbone for a robotic relay network, comprising:
    providing a robotic relay network comprising a plurality of nodes including a base station node, one or more mobile relay nodes, and one or more user nodes;
    identifying a signal strength value for each pair-wise communication link between each of the nodes;
    applying a weight function to each communication link value to determine a communication link weight, wherein the weight function is applied according to one of the following equations:

$$w(v)=1/\sqrt{(v)}$$

where w is the communication link weight, and v is the signal strength value; or $$w(v)=|v-vo| \text{ if } v>vc \text{ and}$$

$$w(v)=M+vc-v \text{ if } v \leq vc$$

where w is the communication link weight, v is the signal strength value, vc is a cutoff signal strength value threshold, vo is an optimal signal strength value, vm is a maximum signal strength value, and M=max(vo−vc, vm−vo); and
    determining an optimal backbone tree from the communication link weights.

8. A method according to claim 7, further comprising:
    identifying the mobile relay nodes in the optimal backbone tree as stable nodes; and
    identifying the remaining mobile relay nodes as redundant nodes.

9. A method according to claim 8, further comprising:
    locating nodes previously unconnected to the mobile relay network by the redundant nodes;
    connecting the located nodes to the mobile relay network; and
    redetermining the optimal backbone tree to include the located nodes.

10. A method according to claim 7, further comprising:
    minimizing the number of mobile relay nodes connecting the user nodes to the base station in the optimal backbone tree.

11. A method according to claim 7, further comprising:
    maximizing optimal link quality of the optimal backbone tree.

12. A method according to claim 7, wherein the signal strength value for each pair-wise communication link is one of an average of the pair-wise communication link and the smaller of the pair-wise communication link.

13. A method for determining an optimal backbone for a robotic relay network with minimal internal nodes, comprising:
    providing a robotic relay network comprising a plurality of nodes including a base station node, one or more mobile relay nodes, and one or more user nodes;
    identifying a signal strength value for each pair-wise communication link between each of the nodes;
    applying a weight function to each communication link value to determine a communication link weight, wherein the weight function is applied according to the equation:

$$w(v)=1/\sqrt{(v)}$$

where w is the communication link weight, and v is the signal strength value; and
    determining an optimal backbone tree comprising a minimal number of nodes connecting the user nodes to the base station from the communication link weights.

14. A method according to claim 13, further comprising:
    determining the shortest path from each node to the base station.

15. A method according to claim 13, further comprising:
    identifying nodes previously unconnected to the mobile relay network; and
    connecting the identified nodes to the mobile relay network.

* * * * *